United States Patent [19]

Biadigo et al.

[11] Patent Number: 4,555,229

[45] Date of Patent: Nov. 26, 1985

[54] AUTOMATIC MACHINE FOR THE INTERNAL FETTLING OF SANITARY APPLIANCES

[75] Inventors: Mario Biadigo, Milan; Gianfranco Zucchi, Brescia, both of Italy

[73] Assignee: Ideal Standard S.p.A., Milan, Italy

[21] Appl. No.: 511,998

[22] Filed: Jul. 8, 1983

[30] Foreign Application Priority Data

Jul. 9, 1982 [IT] Italy ............................ 46843 A/82

[51] Int. Cl.[4] ........................ B29C 25/00; B44D 5/10

[52] U.S. Cl. ................................ 425/267; 51/33 R; 51/34 D; 51/34 H; 51/55; 425/218; 425/385; 425/445; 425/457; 425/459; 425/460; 901/12

[58] Field of Search ......................... 51/31, 33 R, 55; 425/267, 459, 460, 457, 218, 90, 91, 92, 94, 340, 363, 383, 385, 445, 263, 265, 268; D32/1, 4; 901/11, 12, 16, 40, 41, 43

[56] References Cited

U.S. PATENT DOCUMENTS

| | | | |
|---|---|---|---|
| 1,850,939 | 3/1932 | Miller | 425/268 |
| 2,450,437 | 10/1948 | Miller | 425/263 |
| 3,294,256 | 12/1966 | Nazali et al. | 901/12 |
| 3,637,092 | 1/1972 | George et al. | 901/40 |
| 4,014,495 | 3/1977 | Oda et al. | 901/16 |
| 4,132,318 | 1/1979 | Wang et al. | 901/12 |
| 4,233,491 | 11/1980 | Maruyama et al. | 901/16 |
| 4,264,266 | 4/1981 | Trechsel | 901/12 |

FOREIGN PATENT DOCUMENTS

| | | | |
|---|---|---|---|
| 970441 | 9/1964 | United Kingdom | 901/16 |

OTHER PUBLICATIONS

McCormach et al., "The Creeping Technology of Grinding and Fettling", *Decade of Robotics*, 1983, pp. 48–51.

*Primary Examiner*—Jay H. Woo
*Assistant Examiner*—James C. Housel
*Attorney, Agent, or Firm*—Birch, Stewart, Kolasch & Birch

[57] ABSTRACT

An automatic machine for the internal fettling of sanitary appliances in general, which comprises a tappet device elastically loaded towards a cam having a profile conforming to the mouth of the bowls of the articles to be fettled, said device controlling the horizontal excursions of a double slide which supports in an overhanging manner, to lie above a surface on which the articles are arranged, a verticle slider provided with a stepwise-rotatable coaxial shaft on which there is lowerly mounted, in an orientation-adjustable manner, a rotating brush arranged for insertion into the bowls in order to make contact with their entire inner surface extension by virtue of the combination of the aforesaid movements.

11 Claims, 12 Drawing Figures

AUTOMATIC MACHINE FOR THE INTERNAL FETTLING OF SANITARY APPLIANCES

The present industrial invention patent relates to a machine arranged to automatically accomplish the fettling of the inner surfaces of sanitary appliances in general, such as a water closet pans and bidets.

As is known, said fettling operation is nothing other than a finishing of the visible surfaces of the appliances when these have just been removed from the mould and are still in the soft state, said fettling being effected manually by using pads or skeins formed from a weave of filiform plastics material commonly known as SCOTCH BRITE.

The internal fettling of sanitary appliances, such as the fettling of the bowl of bidets and water closet pans, is a very delicate operation both because of the presence of surfaces with different and opposing curvatures, and because of the presence of undercuts as in the case of the rim of water closet pans.

Consequently said fettling requires the use of a large number of workers who are compelled to carry out long, burdensome, complicated, delicate, repetitive and/or monotonous operations.

The present patent provides and protects a machine able to automatically accomplish said internal fettling by means of a simple, rational and extremely reliable constructional design.

According to the invention, the proposed machine comprises a sort of feeler arranged to roll along a guide track which is shaped as the mouth of the bowl of the appliance to be fettled, said feeler being connected to two mutually orthogonal horizontal slides which support, in an overhanging manner, an operating head intended to lie above a surface on which the articles are arranged.

Said operating head comprises a vertical slider on which there is rotatably mounted a vertical shaft moved with stepwise rotary movements and provided lowerly with a rotating brush of orientatable axis.

The combination of all these motions enables the brush to penetrate into the bowl of an appliance such as a bidet, and to travel along the entire perimetral extension of its mouth in such a manner as to make contact with the entire surface of said bowl.

More particularly, said stepwise rotary movements, which each extend through an angle of 90°, take place at the corners of the appliance mouths, in order to optimise the positioning of the brush relative to the variously orientated lateral zones of the bowls of said appliances.

Finally, the aforesaid orientatable fettling brush comprises a shaft provided with a plurality of radial clamps which each carry a thin strip of SCOTCH BRITE which extends radially when the brush is in motion, whereas falls freely downwards when the brush is stationary.

The characteristics and the constructional and operational merits of the invention will be more apparent from the detailed description given hereinafter with reference to the accompanying drawings which illustrate a particular preferred embodiment thereof by way of non-limiting example only.

Figure 1:
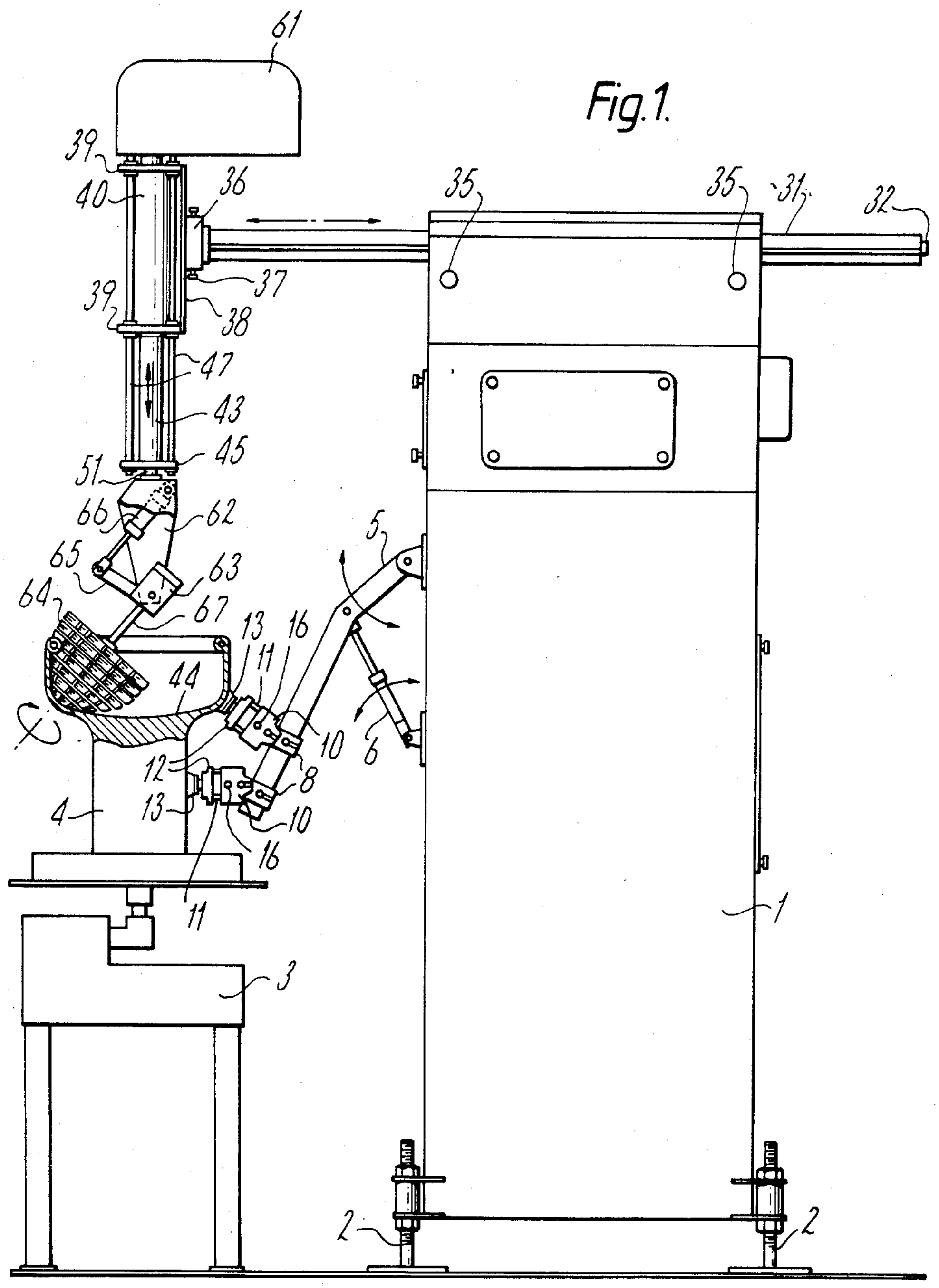
FIG. 1 is an overall side view of the device.

Said figures, and in particular FIG. 1, show a casing 1 provided with adjustable support feet 2, and containing the mechanism for moving the brush in a horizontal plane, and the service equipment for the various devices which make up the machine.

In front of said casing 1 there is a support surface or bench 3 on which are arranged the articles 4 to be internally fettled, namely bidets in this specific case.

The illustrated bench 3 is of fixed type, but according to the invention it can also be constituted by a mobile surface or belt, such as a conveyor, or a line of suitable trollies.

In addition, the bench 3 can be fixed and the casing 1 move autonomously thereto, which can be achieved by the usual methods easily available to experts of the art.

Figure 2:
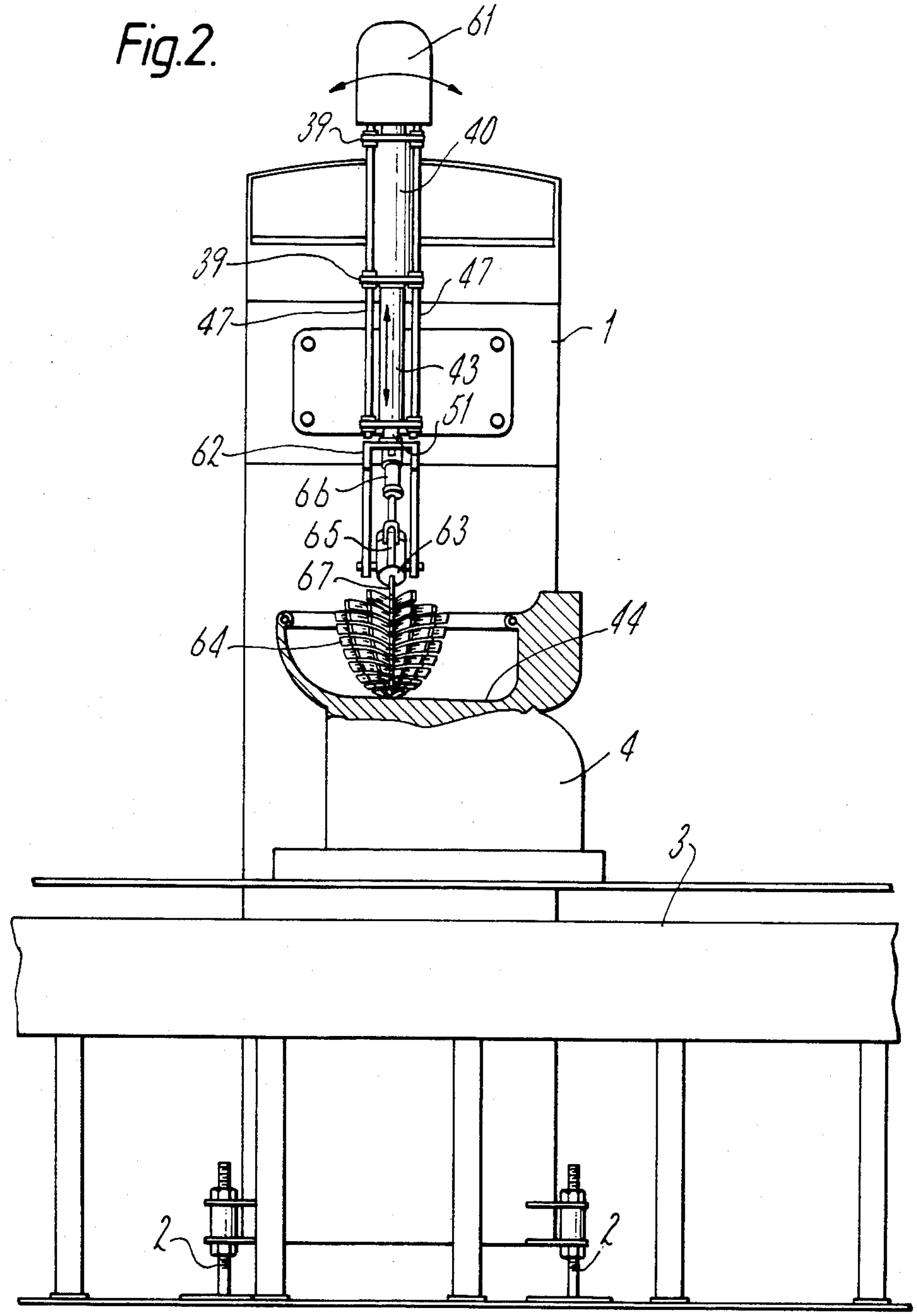
FIG. 2 is a front view thereof.
Figure 3:
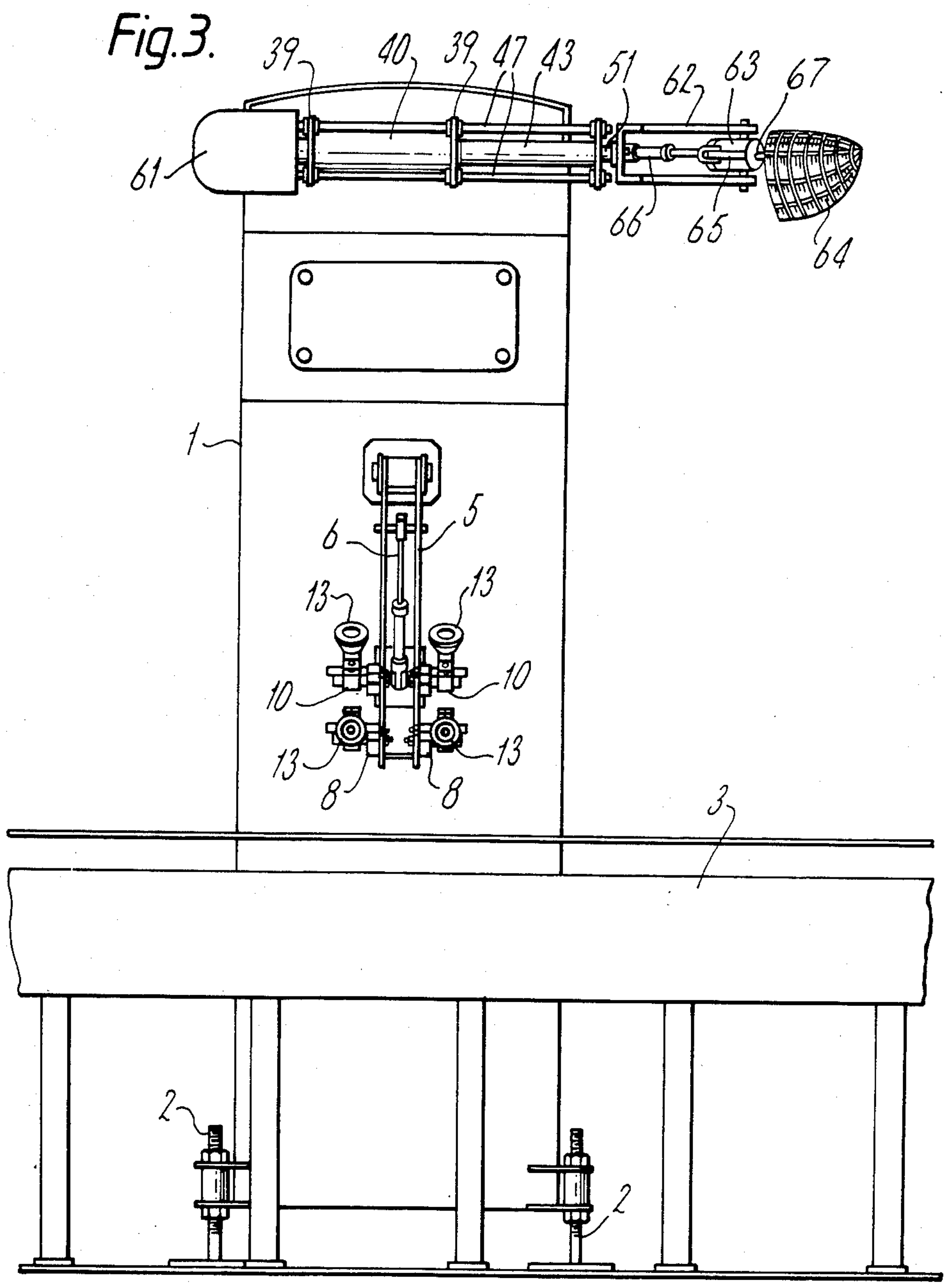
FIG. 3 is a view entirely similar to the preceding, but with the fettling brush removed.

FIGS. 1 to 5 taken together show that to the front wall of the casing 1 at the level of the articles 4 there is hinged a profiled lever 5 which rocks in a vertical plane orthogonal to the bench 3, its rocking movements being controlled by a double acting cylinder-piston unit 6 (FIGS. 1 and 3).

Figure 5:
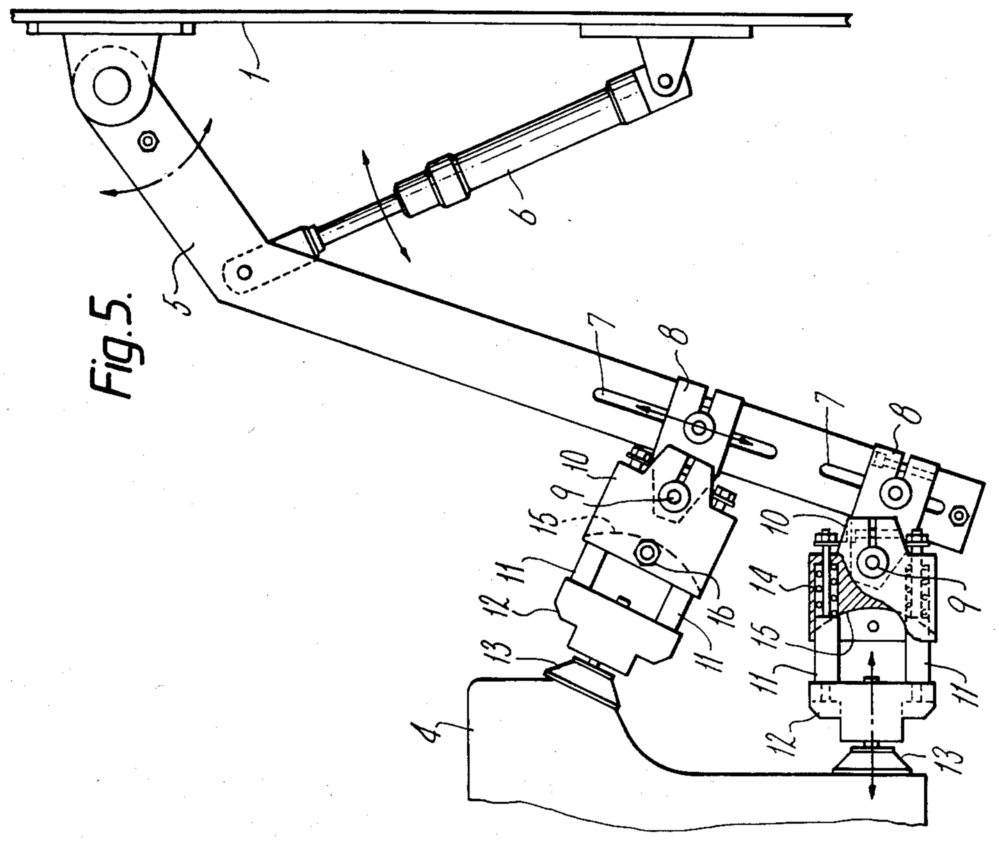
FIGS. 4 and 5 are a frontal and side view respectively of the sucker unit located at the base of the machine, its purpose being to retain the articles during fettling.
Figure 4:
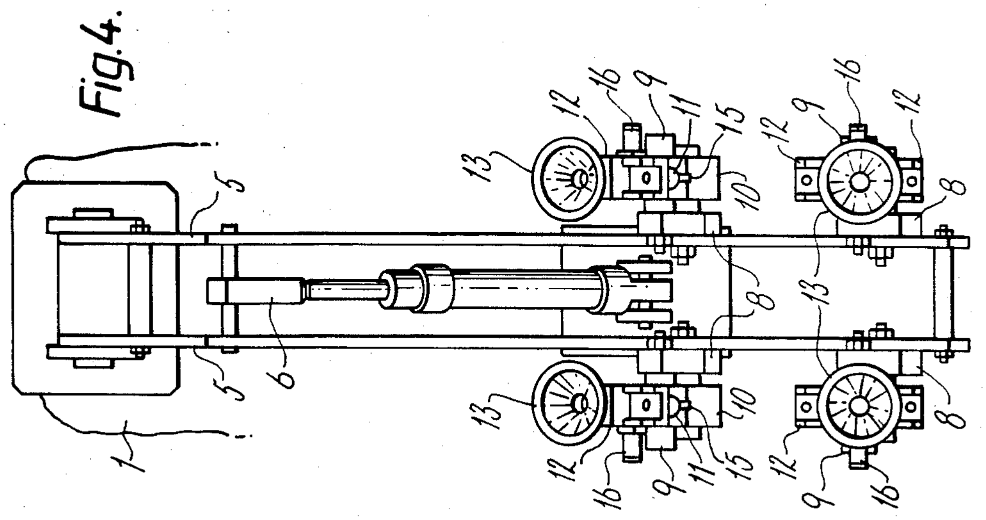

As best shown in FIGS. 4 and 5, the lever 5 comprises two facing plates, at the free end of each of which there are disposed two external clamps 8 which can be adjusted longitudinally along respective slots 7.

Each clamp is provided at its front with an external projecting pin 9 on which a further clamp 10 is externally hinged.

On opposite sides of the clamp 10 there are two cylindrical seats for the sliding of two adjustment pins 11 which branch from a base 12 provided with a sucker 13.

Each adjustment pin 11 is provided with a widened anti-withdrawal head (FIG. 5), and said pin is constantly urged elastically towards the bench 3 by a suitable thrust spring 14.

As again shown in FIGS. 4 and 5, on the side which comprises the sucker 13, each clamp 10 comprises a cut 15 which extends into both the seats of the pins 11.

Transversely to the cut 15 there is centrally provided a small double acting cylinder-piston unit 16, which by utilising the elasticity of the walls of said cut 16 is able to lock the pins 11 and thus the corresponding sucker 13 in the required operating position.

The sucker is connected to a convenient pneumatic unit, not shown.

By virtue of the aforesaid plurality of adjustments, the suckers can be positioned in the most correct manner for securely retaining the articles 4, even of different shapes and types, during the fettling of their bowl 44 (FIGS. 1 and 2).

Figure 6:
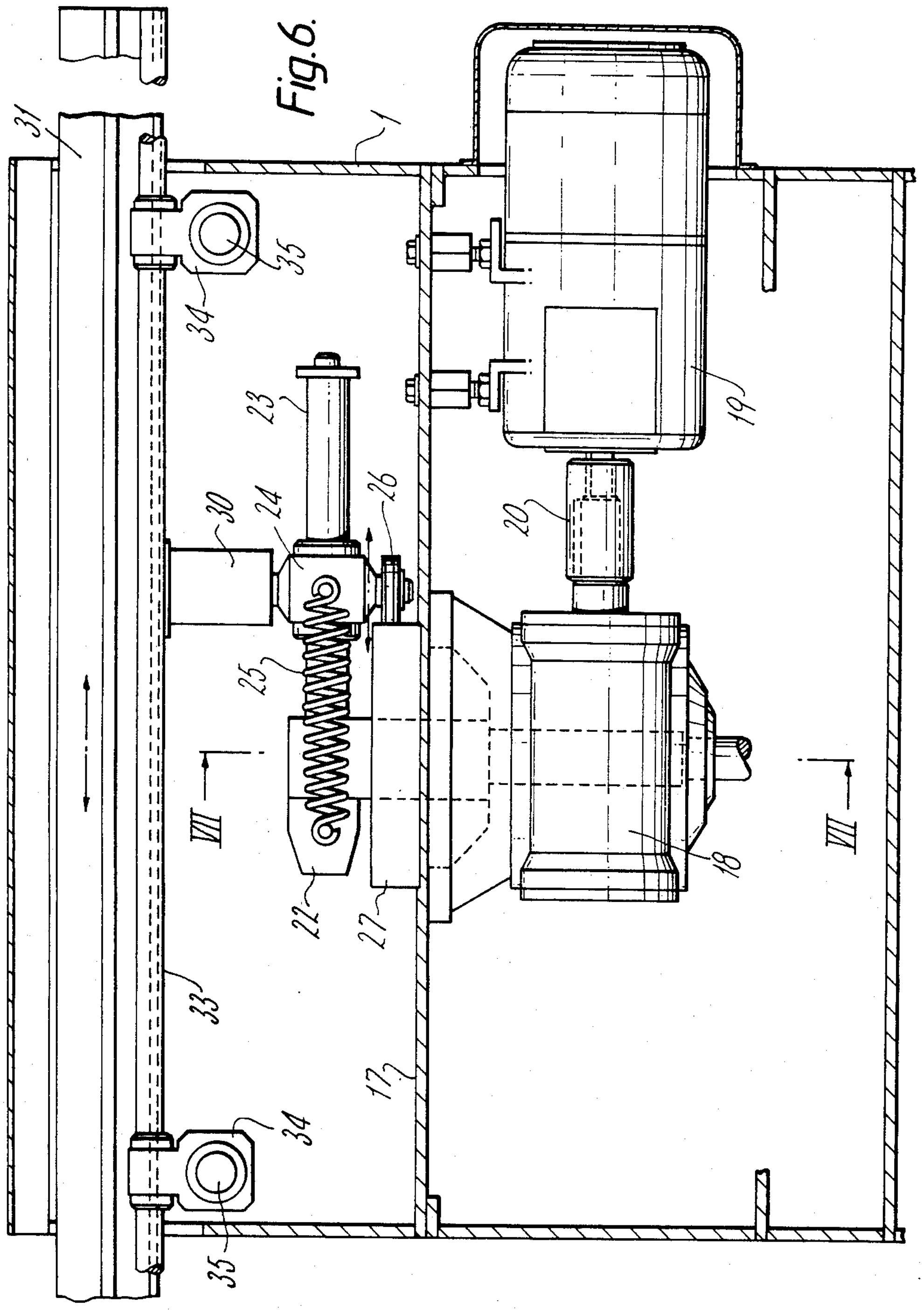
FIG. 6 is an outer side view of the slide unit for controlling the horizontal movements of the fettling brush.

As best seen from FIGS. 6 and 7, the upper part of the casing 1 is provided with a horizontal shelf 17, below which there is fixed a reduction gear unit 18 driven by a respective electric motor 19 by way of a coupling 20 (FIG. 6).

The motor 19 is of the self-braking type in order to allow instantaneous stoppage of the exit shaft from the reduction gear unit 18 when said shaft has accomplished one or more complete revolutions.

Below the geared motor assembly 18, 19 there is a regulator device 21 by means of which it is possible to set the position of said assembly in two mutually orthogonal horizontal directions.

The drive shaft 22 of said assembly 18, 19 passes above the shelf 17 where it comprises an orthogonal arm 23 provided with a slidable bush 24 which is constantly urged towards the shaft by a strong traction spring 25.

The bush 24 lowerly comprises an idle roller 26 arranged to roll on an annular cam or profile 27 fixed to the shelf 17 concentric to the drive shaft 22.

The outer profile of the annular cam 27 conforms to that of the mouth of the bowl 44 of the appliances 4.

Consequently, on varying the type and/or form of these latter, it is necessary only to change the annular profile 27 in order to adapt the machine.

Figure 7:
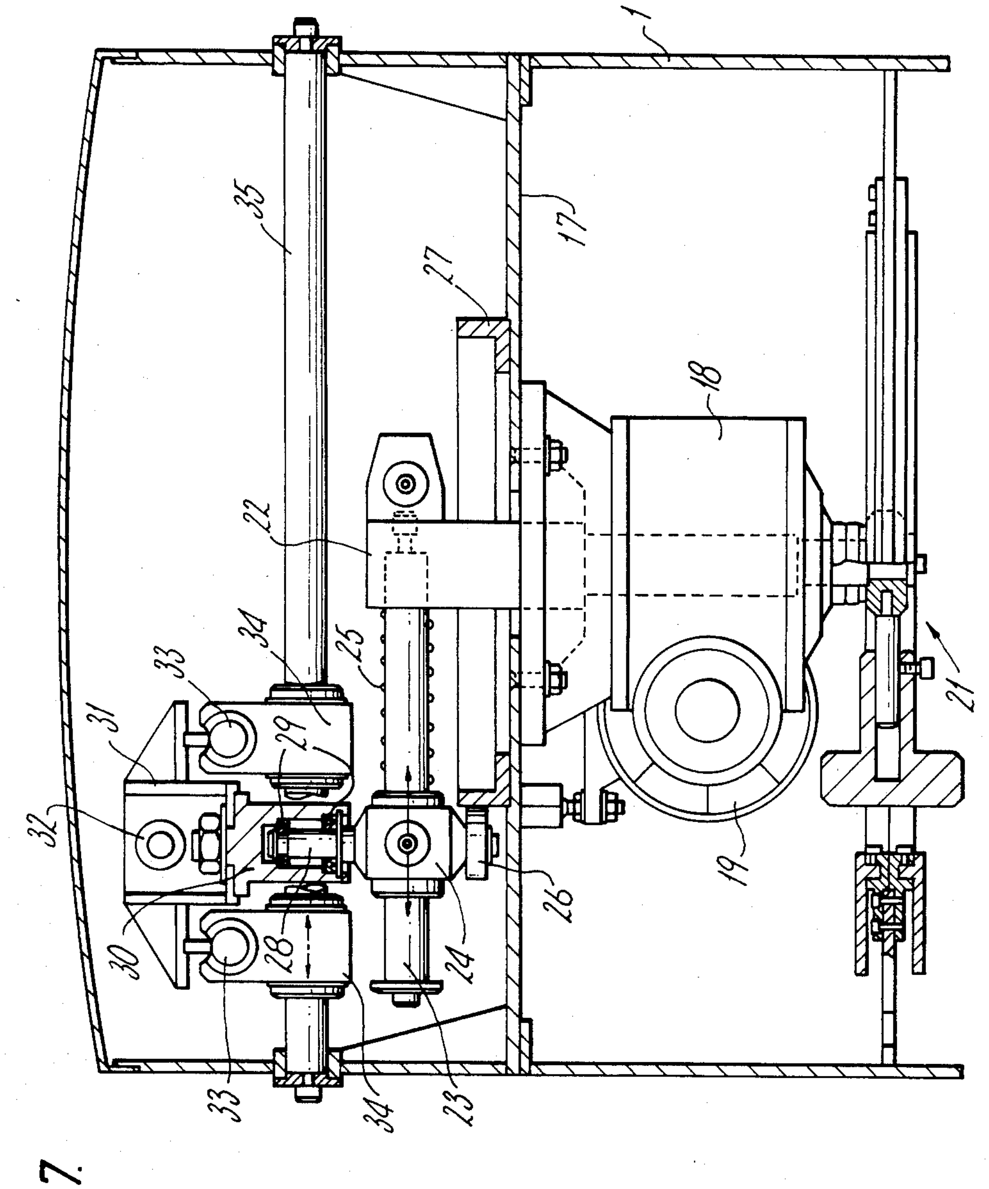
FIG. 7 is a section on the line VII—VII of FIG. 6.

The said FIGS. 6 and 7 show that from the bush 24 there rises a pin 28 which is rotatably mounted, by way of suitable bearings 29, in a block 30, which is fixed at its top to a slide 31.

This latter is centrally configured as a channel, housing an idle horizontal shaft 32.

As is clearly visible in FIG. 1, said slide 31 and shaft 32 emerge from the top of the casing 1 through suitable horizontal apertures, and are disposed orthogonally to the bench 3.

On the opposing sides of the slide 31 there are provided two brackets each fitted with a lower cylindrical bar 33 slidably mounted in the upper seats of two ball couplings 34 of the type comprising two orthogonal seats.

The four couplings 34 are slidably mounted on two underlying horizontal cylindrical bars 35 orthogonal to the bars 33 and fixed to the casing 1 in proximity to the corresponding parallel side walls in order to enable the block 30 to move without interference.

This pair of orthogonal slides enables the roller 36 to travel along the entire outer profile of the annular cam 27.

Figure 10:
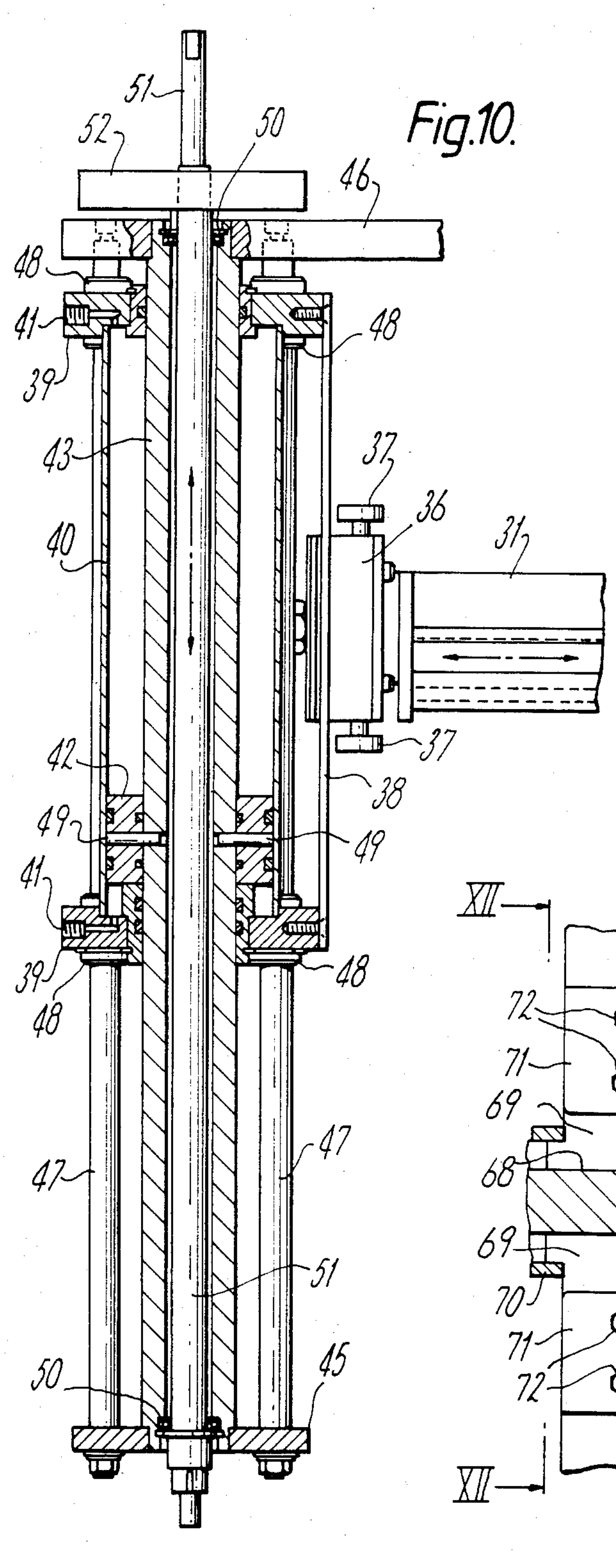
FIG. 10 is a longitudinal section through the slider for positioning the brush at the required level.

As shown in FIGS. 1 and 10, the front end of the upper slide 31 lies above the bench 3, where it comprises a swivel device 36 provided with locking/release screws 37 and having its fixed part rigid with the upper slide 31 whereas its mobile part is fixed to the aforesaid rotatable shaft 32.

As is clearly shown in FIG. 3, said device 36 enables the fettling brush to be swivelled in a vertical plane parallel to the bench 3, so as to dispose it outside the zone occupied by the appliance 4.

To the mobile part of the device 36 (FIG. 10) there is fixed a vertical support plate 38, on which the end walls 39 of a hydraulic chamber 13 are orthogonally fixed.

Said walls 39 are provided with respective feed/discharge ports 41 for the pressurised fluid.

An annular piston 42 fixed on to a central tube 43 by means of radial pins 49 is slidably mounted in the chamber 40 in a sealed manner.

Suitable seal rings are provided between said annular piston 42 and tube 43.

Said tube 43 traverses the two end walls 39 of the hydraulic chamber 40 in a sealed manner, and is clamped between two opposing orthogonal plates, namely a lower 45 and upper 46 respectively.

Said clamping is effected by four cylindrical bars 47 on which the end walls 39 of the hydraulic chamber 30 are slidably mounted by way of respective sleeves 48.

A shaft 51 is rotatably mounted in the tube 43 by way of suitable bearings 50.

By virtue of the combination of the aforesaid means, the fettling brush can be moved vertically together with the slider 45, 46, 47,51 in order to be inserted into and withdrawn from the bowls 44 of the appliances 4.

Figure 8:
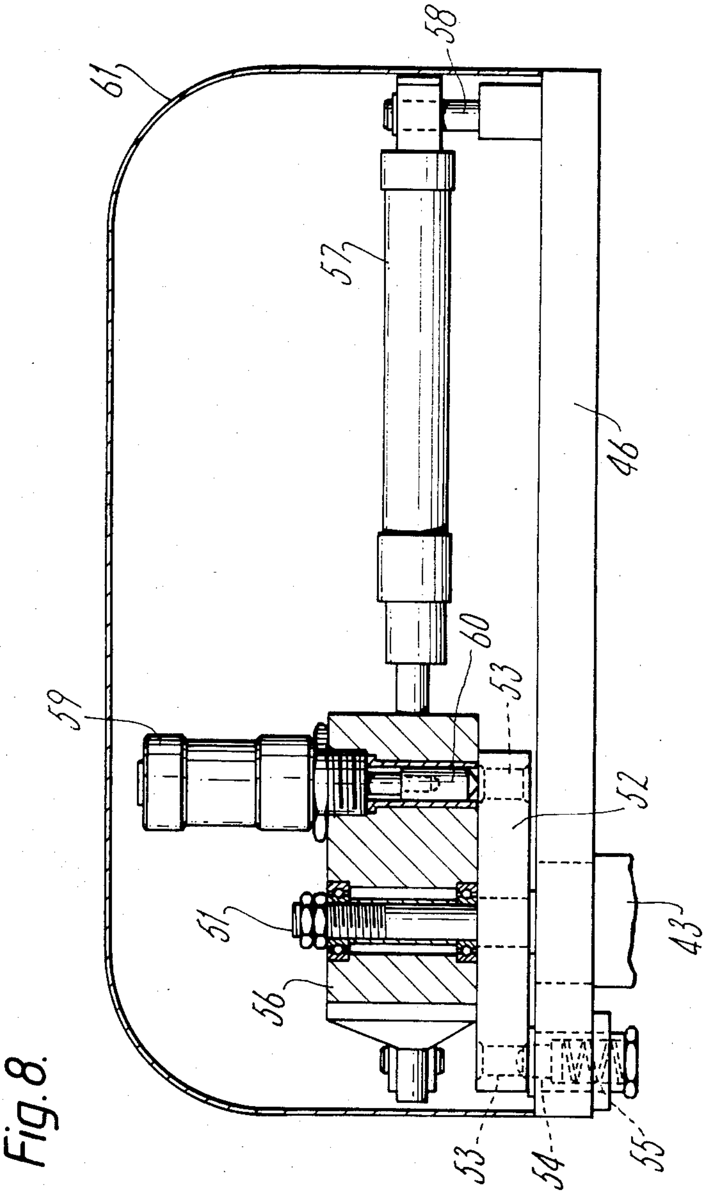
FIGS. 8 and 9 are a longitudinal vertical section and a plan projection respectively of the device for the stepwise rotation of the fettling brush.
Figure 9:
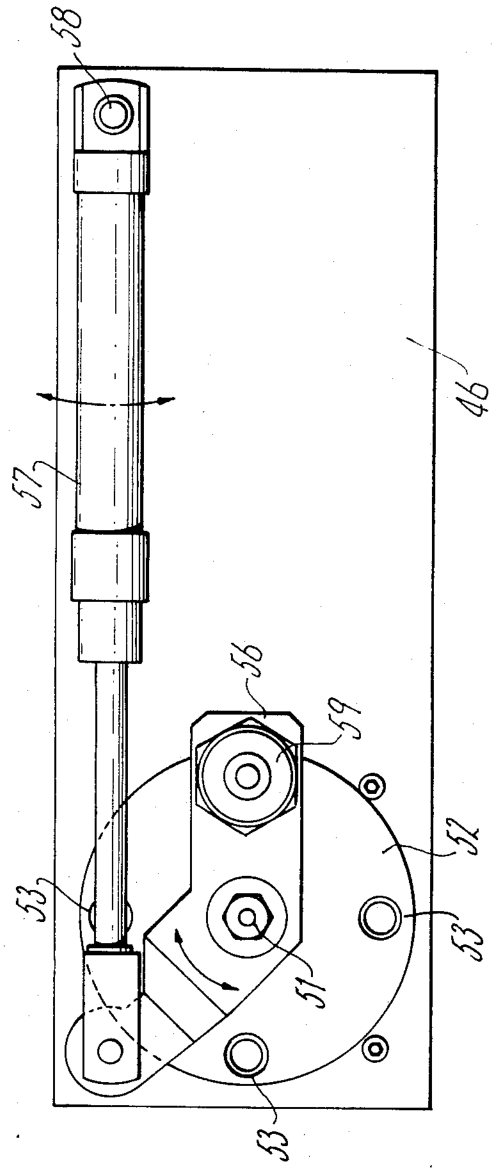

The upper end of the shaft 51 passes above the plate 46, where there is fixed to it a disc 52 provided with four equidistant through bores 53, of which the opposing mouths are conveniently flared, as best seen from the accompanying FIGS. 8 and 9.

The lower mouths of said bores 53 receive a hemispherically ended tappet 54 which is slidably mounted in a seat of the plate 46, and is constantly forced upwards by a spring 55.

At the top of the shaft 51, and above the disc 52, there is rotatably mounted a rocker arm 56, on one end of which there acts the rod of a double acting pneumatic cylinder-piston unit 57, of which the body is hinged at 58 to the plate 46.

On the opposite end of said rocker arm 56 there is fixed a double acting pneumatic cylinder-piston unit 59, of which the rod carries a latch 60 arranged to alternately enter, and withdraw from, through bores 53 in the disc 52.

Although not shown, it should be noted that on the plate 46 there is a logic pneumatic circuit arranged to synchronously control the operation of the two pneumatic units 59 and 57.

The entire assembly is closed by a cover 61.

The purpose of the aforesaid device is to cause the shaft 51 and thus the fettling brush to rotate stepwise through 90° each time.

At this point, it should be noted that said stepwise rotations take place each time the fettling brush arrives at one of the corners of the mouth of the bowl 44 of the pieces 4, in order to maintain correct orientation of the brush relative to the side walls of said bowl.

For the reasons which will be more apparent hereinafter, said pneumatic logic circuit is also constructed in such a manner that for one complete revolution, ie for one appliance 4, the shaft 51 rotates in one direction, whereas for the next appliance it rotates in the opposite direction, and so on.

As best seen from FIGS. 1, 2 and 3, the lower end of the shaft 51 has fixed to it the cross-member of a fork 62, between the free ends of its arms there being hinged, on a horizontal axis, a pneumatic motor 63 for driving the fettling brush 64.

From the motor 63 there branches an appendix 65 to which is hinged the rod of an overlying double acting cylinder-piston unit 66 for adjusting the inclination of the axis of the brush 64.

The corresponding service pipes are connected in known manner to said motor 63 and unit 66, and it is for this reason, ie to prevent the twisting and fracturing of said pipes, that the shaft 51 is made to rotate for one complete revolution in one direction and then in the opposite direction.

If it is desired to obviate said reversal, it is necessary only to use a shaft 51 of hollow type and pass said pipes therethrough, and connect them to respective rotary distributors provided at its top.

Figure 12:
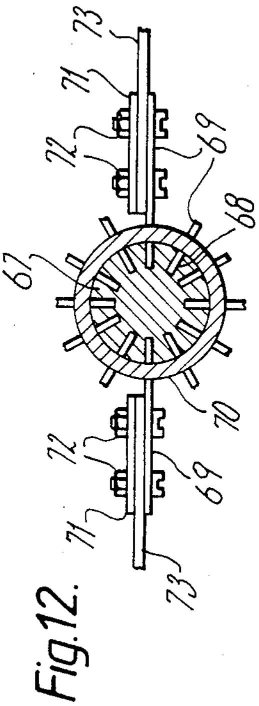
FIGS. 11 and 12 are a longitudinal and transverse partial section respectively through the fettling brush of the invention.
Figure 11:
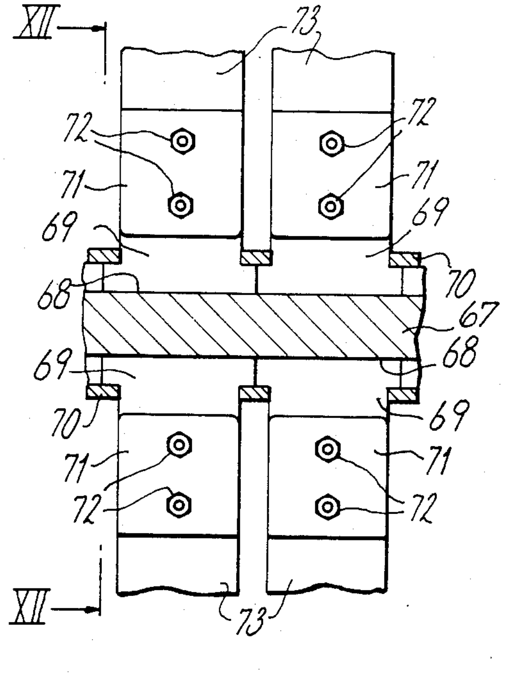

As best shown in FIGS. 11 and 12, the brush 54 comprises a shaft 67 provided with a series of equidistant circumferential slots 68, with each of which there is associated a plurality of radial clamps.

Each clamp comprises a connection plate 68, of which the inner portion, ie that which is intended to be inserted into one of the slots 68, is of T configuration.

Between each pair of adjacent circumferential rows of connection plates 69 there is disposed a retention collar 70, arranged to engage the said T-shaped portions, and the entire assembly is clamped into a stack between two suitable end elements.

A thin strip of SCOTCH BRITE 73 is fixed to each connection plate 69 by means of a locking plate 71 and a respective pair of bolts 72.

Said strip 73 extends vertically in a flabby condition (FIG. 3) when the shaft 67 is stationary, whereas when the shaft rotates, the strip extends radially as shown in the accompanying FIGS. 1 and 2.

The operation of the invention is easily understood from the preceding and from a simple examination of the figures.

We claim:

1. An apparatus for fettling the internal surface of a vessel which comprises:
- a profile member configured to the shape of the internal surface of the vessel;
- a tappet device arranged to trace said profile member;
- a slide means operatively connected to said tappet device, the motion of said tappet device being transferred to said slide means;
- a slider means mounted for vertical motion on said slide means;
- an orientatable rotary head member connected to said slider means, said head member comprising a central shaft having a plurality of radial clamps, each of said radial clamps being fitted with a thin flexible strip of a soft weave or mat of slightly abrasive filiform plastic material; and
- means for causing said head member to traverse the internal surface of the vessel in a stepwise rotary motion in conformity with the traversal of the profile member.

2. The apparatus of claim 1, wherein the profile member is a cam means and the tappet device includes a roller means adapted to trace the periphery of the cam means and means for moving the roller means on said cam means.

3. The apparatus as claimed in claim 1, wherein the tappet device comprises:
- a rotatable vertical shaft;
- a horizontal shaft which is rotated by said vertical shaft; and
- a slidable brush provided with an idle roller mounted on said horizontal shaft, said idle roller being constantly pressed elastically against said profile member, which is disposed to enclose said rotatable vertical shaft.

4. The apparatus of claim 3, wherein said slide means is a double slide comprising:
- a first horizontal slide disposed over said tappet device, said first horizontal slide supporting said slider means and being slidably mounted on a second horizontal slide orthogonal to it; and
- a rotatable pin extending upwards from said slidable bush and linking said first horizontal slide and said tappet device.

5. The apparatus of claim 1, wherein said slider means comprises:
- a coaxial shaft disposed therein;
- a support fixed to the base of said coaxial shaft; and
- a motor for driving said head member fixed to said support, said motor being hinged on a horizontal transverse axis.

6. The apparatus of claim 5, wherein said slider means further comprises:
- a cylindrical chamber fixed to the end of said first horizontal slide;
- a coaxial tube which emerges to the outside of said cylindrical chamber where said coaxial tube is torsionally locked, said coaxial shaft being rotatably mounted in said tube; and
- an annular piston slidably mounted in a sealed manner in said cylindrical chamber and fixed onto said coaxial tube.

7. The apparatus of claim 6, wherein a rotational device is disposed between said first horizontal slide and said cylindrical chamber, said rotational device being arranged to enable the cylindrical chamber to lie horizontally in order to move said orientatable rotary head member to a zone outside that occupied by the vessel.

8. The apparatus of claim 5, wherein said support comprises a cylinder-piston unit hinged to said motor of said head member, and arranged to vary the orientation of said head member.

9. The apparatus of claim 1, wherein gripping means are located to the side of a surface on which the vessels are arranged, said gripping means being adjustable overall relative to said surface and adjustable relative to each other, and arranged to retain the vessel during the fettling operation.

10. The apparatus of claim 6, which includes means for stepwise positioning of the head member and operating head attached thereto within the vessel during rotation of the head member.

11. The apparatus of claim 10, wherein the means for stepwise positioning of the head member and operating head attached thereto within the vessel during rotation of the head member are operated by a cylinder piston unit and are located at the top of said coaxial shaft.

* * * * *